THICKNESS OF OXIDE LAYER III (μ)

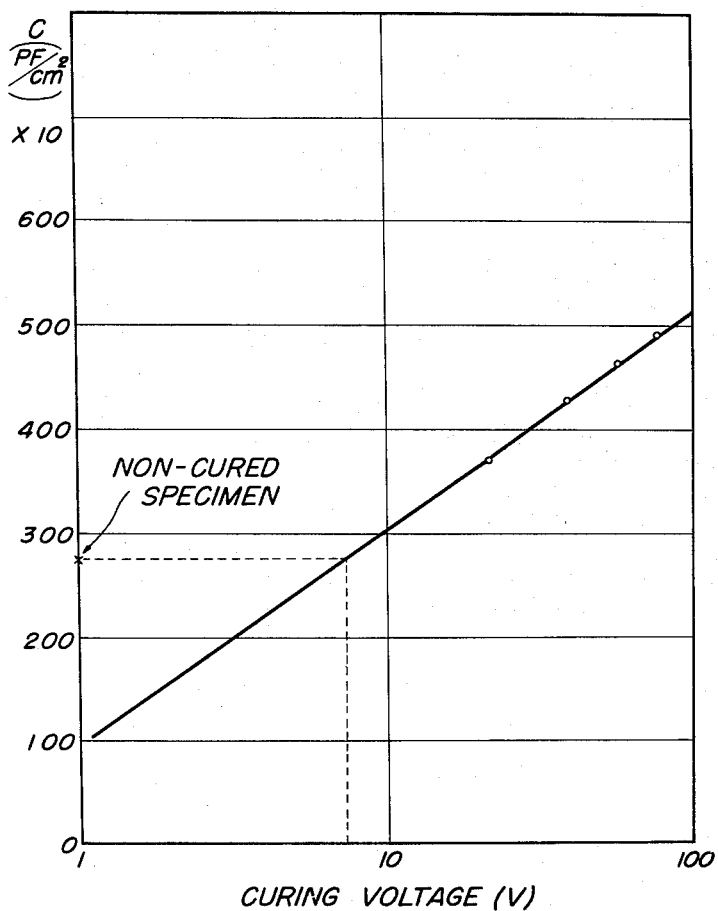

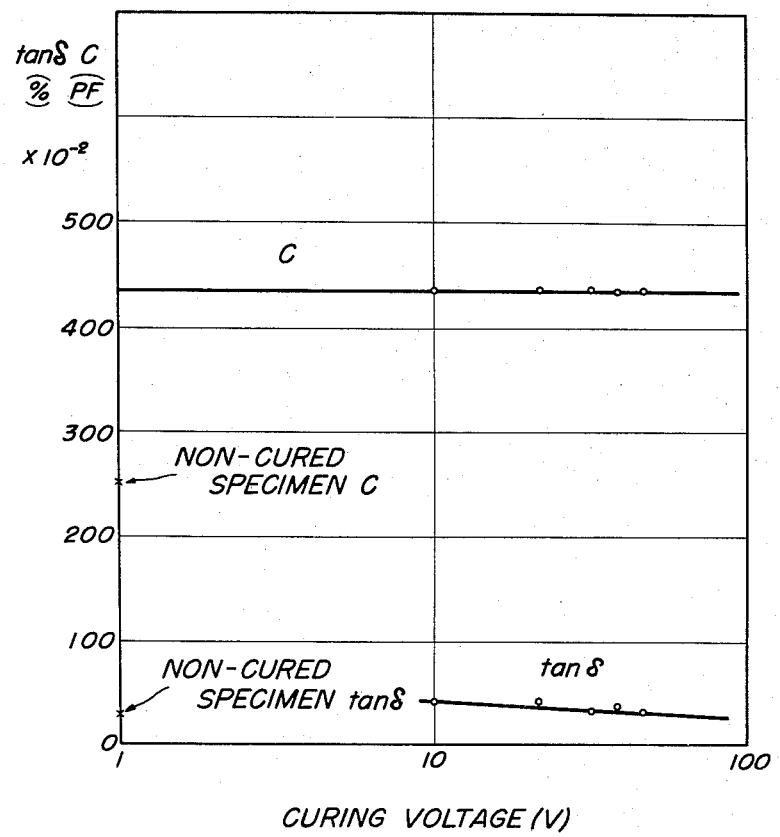

INVENTORS
Hiroshi Hagiwara
Akio Yamashita
Asao Matsuda

United States Patent Office 3,259,558
Patented July 5, 1966

3,259,558
METHOD OF PRODUCING A METAL OXIDE COATING
Hiroshi Hagiwara, Higashiyodogawa-ku, Osaka, Akio Yamashita, Ikeda-shi, Osaka, and Asao Matsuda, Nishinomiya-shi, Japan, assignors to Matsushita Electric Industrial Co., Ltd., Osaka, Japan, a corporation of Japan
Filed Feb. 12, 1962, Ser. No. 172,673
Claims priority, application Japan, Feb. 15, 1961, 36/5,185; June 9, 1961, 36/20,616; June 12, 1961, 36/21,025
2 Claims. (Cl. 204—38)

This invention relates to a process of producing dielectric or semiconductor devices.

In the past, formation of metal oxide on a metal surface has been effected by heating the metal from the exterior thereof. This has certain disadvantages. For example, in such exterior heating, the diffusion of oxygen atoms effective to promote the oxidation takes place solely according to the gradient of concentration of oxygen atoms with the result that some variations in the oxygen concentration occur in the oxide formed, precluding formation of any uniform oxide of a dielectric or semiconductor material of satisfactory characteristics.

The invention aims to provide a semiconductor or dielectric device comprising a film of titanium, tantalum, aluminum, zirconium, hafnium or niobium oxide whereon the oxide is more uniform than hitherto.

According to the invention a semiconductor or dielectric device has a metallic base structure of titanium, tantalum, aluminum, zirconium, hafnium or niobium and the metallic base has an oxide film thereon formed by the reaction of the surface of the metal when the surface is heated in the presence of an atmosphere of oxygen or oxygen containing an inert gas.

The definition of "heating from the inside" means that the heating of the oxidizable metal is effected in a manner such that there is a heatflow from the inside of the metal towards the outside. This can be effected for example by placing the oxidizable metal in contact with another metal which is then heated so that heat is conducted from the said other metal to the oxidizable metal so that the oxidizable metal is heated at one side and the oxide formed on the other side by the conduction of heat through the plate.

The present invention will now be described in detail with reference to the accompanying drawings, in which:

FIG. 6 is a graphical representation of the capacity relative to the formation voltage of a condenser being treated in accordance with the present invention and including a titanium wire subjected to anode oxidation;

FIG. 7 illustrates the relation between the capacity and tangent δ (dissipation factor) and the formation voltage of a condensr including a titanium wire subjected to anode oxidation and subsequent internal heating;

The invention will now be further described with reference to tests which have been formed. The heating process employed in the present invention comprises so-called internal heating, which provides reaction heat for oxidation by conduction from the body of the metal. Some examples of the process are: a method in which the base metal is heated by passing a current through the metal itself to develop Joule heat; high frequency induction heating; and a heating method employing means other than electric current, for instance a method of forming an oxide film on one surface of a metal plate by heating the other surface thereof with a gas burner. In such process of internal heating, the temperature gradient in the oxide film is such that the temperature thereof on the metal side is higher than the surface temperature of the oxide film. This can also be readily understood by observing the cross section of metal specimens subjected to external and internal heating, respectively, with the surface temperature of the oxide film being formed held constant. It is to be seen that the specimen subjected to internal heating has grains grown to a size larger than those of the other specimen. In general, diffusion of atoms of gases may be formulated as follows:

$$D = D_0 l^{\frac{E}{kt}}$$

where D represents the diffusion coefficient; $D_0$, a constant; E, activation energy; k, Boltzmann's constant; and T, absolute temperature. As apparent from the formula, in case of the internal heating, the diffusion coefficient increases toward the base metal side of the oxide film. This enables oxygen to be amply diffused into the interior of the oxide film, causing distinctive features as described below.

For one instance, in case of metal titanium, it has been found that the structure of the oxide film formed thereon either by internal or external heating includes generally three layers.

Figure 1A:
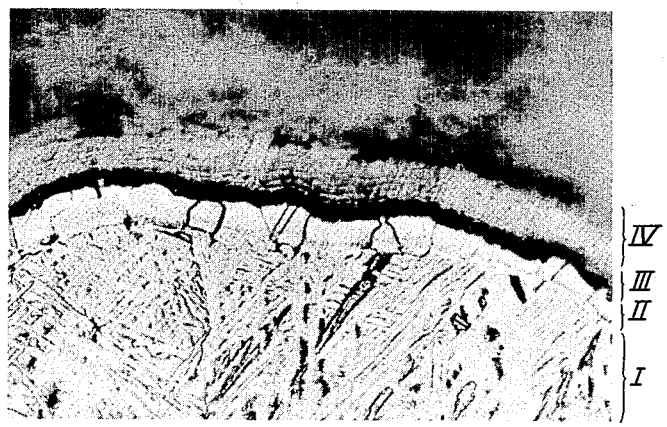
FIG. 1a is a schematic representation of a sectional photograph taken by a metal microscope of a specimen of metal titanium after it has been internally heated, by passing a current therethrough to maintain the surface of the oxide film being formed at 1000° C. for five minutes.
Figure 1B:
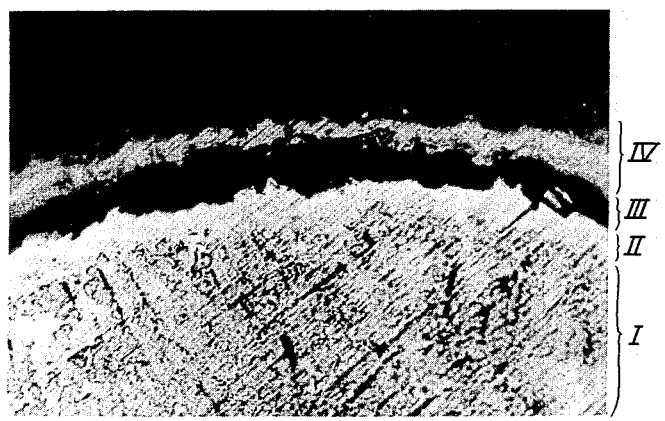
FIG. 1b is a similar representation obtained by externally heating a specimen of metal titanium in a high-temperature furnace held at 1000° C.

According to the results of the X-ray analysis conducted with such layers of the oxidized film or specimens, the cross sections of which are represented in FIGS. 1a and 1b, respectively, layer I is formed of metal titanium; layer II is formed of an intrusion type solid solution of of oxygen, hydrogen, nitrogen and the like in titanium; layer III is a layer of rock-salt type crystals of TiO and TiN; and layer IV is formed of TiO₂ of the rutile type. Among others, the intensity of X-ray reflection at the plane (110) of the rutile type TiO₂ obtained by the internal heating of the present invention 1.7 times as high as that obtained by the external heating, indicating the excellent crystalline property of the oxide film according to the present invention.

Figure 2:
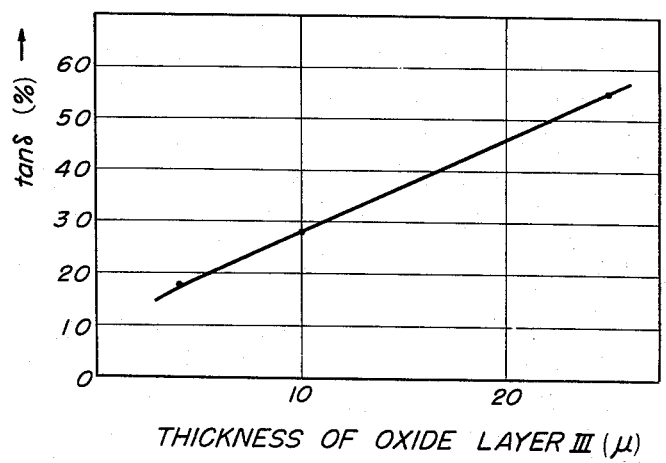
FIG. 2 is a graphical representation showing the proportional relationship between dielectric loss (tan) and the thickness of the layer including TiO and TiN.

As is understood from the foregoing, in case of the external heating, the supply of oxygen to the interior of the oxide film is insufficient causing a substantial layer of TiO and TiN to form, while in case of the internal heating oxygen is amply supplied to the interior of the oxide film resulting in an extremely thin layer of TiO and TiN. Further, as shown in FIG. 2, the thickness of the TiO-TiN layer is directly proportional to the dielectric loss tangent, tan $\delta$, or dielectric dissipation factor which means that the TiO-TiN layer acts as a series resistance causing tan $\delta$ to increase. It follows that to serve as a dielectric the titanium oxide film should preferably be formed by the internal heating to exhibit better crystalline properties with a lesser impurity layer.

Figure 3A:
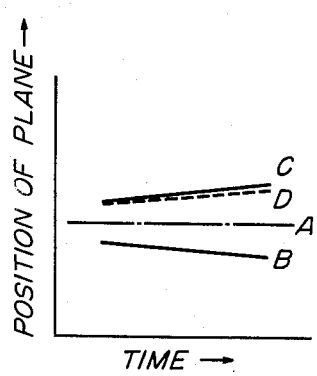
FIGS. 3a and 3b represent the density change of the oxides film in the course of internal and external heating, respectively.
Figure 3B:
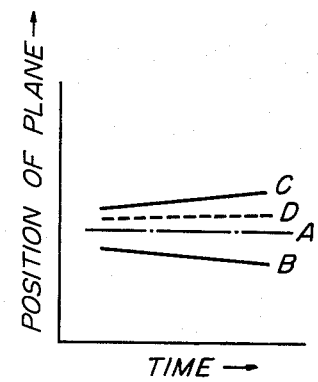

FIGS. 3a and 3b illustrate the result of investigations conducted with the oxide films for determining the density or compactness thereof. In these figures, the abscissa represents heating time and the ordinate corresponds to the distance measured from a point assumed in the interior of the metal titanium. FIG. 3a corresponds to the case of internal heating and FIG. 3b to the case of external heating, the surface temperature of the oxide film being held at 1000° C. in both cases. In these figures, character A indicates the position of the surface of the metal titanium before heating; character B, the position of the surface of the metal titanium which has retracted inwardly with oxidization of the surface; character C, the position of the surface of the oxide film now having a substantial volume by oxidization; and character D, the position to be assumed by the surface of the oxide film having a 100% compactness with respect to the volume of metal titanium used in the oxidization. It is observed that the oxidization proceeds as the time elapses to increase the thickness of the oxide film and that, while the thickness of an oxide film actually formed by external heating is considerably larger than that of the oxide film having a 100% compactness, the thickness of an oxide film formed by internal heating according to the present invention is substantially the same as that of the oxide film having a 100% compactness, i.e. the oxide film formed by internal heating has a very high compactness.

Electric characteristics of such oxide films will now be described. Experimental results show that, when heated to 800° C., the dielectric loss tangent of the oxide film formed by external heating may not be reduced to lower than 20% (1 kc.), but that of the film formed by internal heating may be reduced to 0.5% (1 kc.).

As apparent from the foregoing, the internal heating makes it possible to form oxide films which are excellent as a dielectric in all respects including compactness, tan $\delta$ and crystalline property, and additionally has an important advantage that the heating temperature may be freely and rapidly varied. Utilizing this advantage, we made condensers including a dielectric element in the form of an oxide film formed on the surface of a metallic titanium wire by heating the latter to the vicinity of 1300° C. in a relatively short period of time as described below and compared the electric characteristics of the condensers with a conventional ceramic one.

Figure 4:
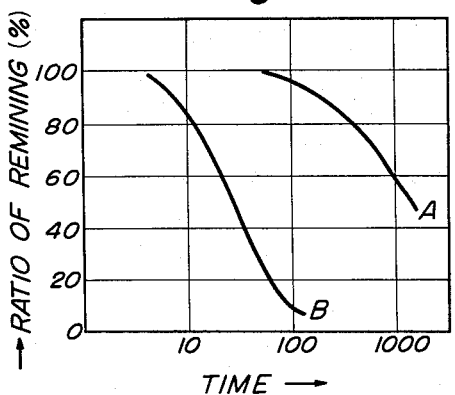
FIG. 4 represents the results of a bare life test conducted at 95% relative humidity with a condenser including a titanium wire having an oxide film formed according to the present invention and a silver electrode baked thereon in comparison with a barium titanate ceramic condenser.
Figure 5:
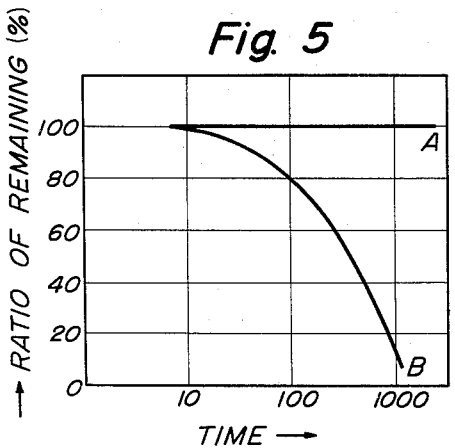
FIG. 5 represents the result of a temperature acceleration life test conducted at an ambient temperature of 100° C. with specimen similar to those used in the test the result of which is shown in FIG. 4.
Figure 10:
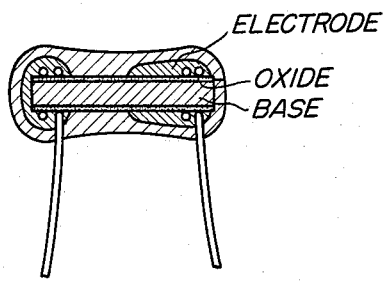
FIG. 10 is a diagrammatic showing of one form of the inventive method of forming an oxide.

A titanium wire having a diameter of 0.5 mm. was first cleaned with a common solvent, such as benzene, and then heated for oxidization under the atmospheric pressure to 1300° C. within 10 minutes by passing electric current therethrough. A silver electrode was baked onto the surface of the oxide film formed to obtain a condenser shaped as shown in FIG. 10. It has been found that by this procedure condensers may be manufactured which has a capacity ranging from approximately 10 pf to approximately 10,000 pf with a dielectric loss tangent from 0.1% to 0.2% (1 kc.) and a breakdown voltage of 30 v./$\mu$. FIGURE 4 illustrates the result of a bare life test conducted at a relative humidity of 95% to compare such condensers with a conventional barium titanate ceramic condenser, and FIG. 5 illustrates the result of a temperature acceleration life test conducted at an ambient temperature of 100° C. with the similar condensers. In these figures, character A indicates the remaining factor of the condenser according to the present invention; and character B indicates that of the conventional article.

From the foregoing, it follows that, while it is very difficult to produce ceramic condensers of the conventional type having a dielectric film of a thickness ranging from several microns to about 60 microns, such thin films may be formed with ease by the method of the present invention. In addition, it has been found that condensers according to the present invention is excellent in moisture proofness as compared with conventional ones, which have involved various difficulties in this respect, and has a breakdown voltage more than five times as high as that of condensers of conventional make. The following is a list comparing the inventive condensers with conventional ceramic ones.

|  | Conventional condensers | | Condensers according to the invention |
|---|---|---|---|
|  | Titanium oxide type | Barium titanate type |  |
| Thickness of the dielectric, $\mu$ | 300–500 | 300–500 | 1–50 |
| Volume to capacity, cm.$^3$/$\mu$f | 280 | 7 | 0.9 |
| Dielectric loss tangent, percent: | | | |
| (1 kc.) | 0.1 | 0.3 | 0.1 |
| (1 mc.) | 0.05 | 0.4 | 0.05 |
| Breakdown Voltage (D.C.), kv./mm | 6–8 | 6–8 | 30–40 |

Further, it has been found that oxide films having an excellent crystalline property may be obtained by subjecting the base metal to anodic oxidation treatment in an electrolytic solution to form an anodized film on the metal surface and then heating the film from its base metal side for further oxidization as described hereinbefore.

For one instance, the oxide film obtained by anodic oxidation of metal titanium is so thin that it may not exhibit satisfactory insulation when an opposite electrode is bonded directly to the film, but it has a very high compactness. Where oxidization by internal heating is effected in the presence of such compact anodized film, the oxide film continues to grow while maintaining its compactness under the influence of the initial anodized film. Thus, in case of metal titanium, an oxide film may be formed which has the advantages of the respective types of oxidization. Thus, the film may have a large thickness as enabled by the heating oxidation in an oxygenic atmosphere and a substantial compactness as afforded by the anodic oxidation.

As a result, the oxide film is formed of TiO$_2$ of the rutile type having a dielectric constant of approximately 100, and in addition may have a thickness of 1$\mu$ to 50$\mu$, eliminating the need of interposing a semiconductor layer between the film and an opposing electrode attached thereto, as distinct from the case of films formed by anodic oxidation. This makes it easy to produce condensers of a large capacity. FIG. 6 illustrates the relation between the capacity and the formation voltage of such condensers having the same film thickness and electrode area. As indicated in this figure, a specimen subjected to a formation voltage of 80 v. exhibits a dielectric constant approximately 1.78 times as large as that of a non-anodic formed specimen having the same film thickness and electrode area but not subjected to anodic oxidation.

FIG. 7 illustrates the relation between the formation voltage and the capacity as well as tangent $\delta$ of condensers made in this manner. As observed in this figure, specimens first subjected to anodic oxidation have a dielectric constant approximately 1.74 times as large as that of non-treated specimens. In FIGS. 6 and 7, the frequency used in the measurement was 1 kc.

Though the above description has been made in connection with the metal titanium, substantially the same results have been obtained with tantalum and zirconium, as will readily be understood. It is noted that the oxide film formed by anodic oxidation as in conventional electrolytic condensers is so thin that short-circuiting may take place when the opposite electrode is directly formed thereon, while the dielectric layer of ceramic condensers has a thickness of more than 100 microns, which is too large. According to the present invention, an oxide film having an intermediate thickness of from one micron to 50 microns may be readily formed, noticeably facilitating miniaturization of condensers and improving the electric characteristics thereof owing to the use of internal heating characteristic of the inventive method.

1. Resistors

As described hereinbefore, a base metal is internally heated in an atmosphere including oxygen to form an oxide film on the metal surface. This oxide film when formed thin may serve as a resistor. Thus, a resistance element may be formed by attaching to the film a metal which may make a resistant contact therewith. The resistance value of the element depends upon the thickness of the oxide film and thus can be determined as desired by controlling the film thickness by suitably selecting the heating temperature and heating time.

For example, a current is passed through a titanium wire of 0.5 mm. diameter in air for internal heating to form a titanium oxide on the metal surface. The electric properties of the titanium oxide vary with the heating temperature and the heating time as seen in the following table of measured values.

| Heating temperature, °C. | Heating time, min. | Capacity, pf. | Dissipation factor tan δ | Breakdown Voltage, v. | Resistance value, Ω |
|---|---|---|---|---|---|
| 600 | 1 | | | | 3 |
| 800 | 1 | | | | 40 |
| 1,000 | 1 | | | | 500 |
| 1,200 | 1 | 900 | 5.1 | 20 | |
| 1,280 | 1 | 570 | 2.6 | 135 | |
| 1,360 | 0.02 | 136 | 3.0 | 146 | |
| 1,240 | 2 | 242 | 1.4 | 176 | |
| 600 | 2 | 246 | 0.8 | 325 | |
| 400 | 2 | 240 | 0.2 | 550 | |

As observed in this table, the oxide film is utilizable as a resistor when formed at a lower temperature and hence having a smaller thickness. The conditions for forming a resistor, however, depends upon the correlation between the heating temperature and the heating time. Thus, with a high heating temperature on one hand, a correspondingly short period of heating may give a desired value of resistance with accuracy and ease, while with a low heating temperature on the other hand, a correspondingly long period of heating may be employed to obtain the same result. Additionally, the resistor grows thick as the oxidization continues to form a dielectric. The oxide formed in the manner described above has a characteristic feature inherent to the internal heating procedure, and may produce a resistor much better than one of conventional make in stability of the resistance value and/or moistureproofness. An example of such resistor is constructed as shown in FIG. 10.

2. Semiconductors

The metal titanium is heated under special conditions taking advantage of the internal heating to form a semiconductive oxide film on the metal surface. The titanium oxide semiconductor forms a rectifying layer when contacted by another metal such as gold, silver, copper or bismuth. Such characteristic of the semiconductor may be made use of to form a rectifier. In the past, metal titanium has first been oxidized by heating in an atmosphere containing oxygen, such as air and then heated in hydrogen to be reduced. In these heating procedures, the metal titanium has been placed in a furnace to be heated from the exterior thereof.

Thus, in the conventional process, two steps of oxidization and reduction have been required, that is, a semiconductor having oxygen vacancies in its lattice is formed by first forming titanium oxide and then reducing the latter. Such treating process has naturally been disadvantageous because of its complicacy.

The present invention provides a method of producing titanium oxide semiconductors on the surface of metal titanium by a procedure which does not require such two separate steps of oxidization and reduction, nor may be separated into such two steps. The inventive method is characterized in that metal titanium is heated from the metal side in oxygen or a gaseous mixture of oxygen and a gas which does not react with metal titanium to form an insulator, such as argon, xenon, neon or krypton, or in a gaseous mixture of oxygen and a very limited amount of any of gases other than those which react with metal titanium to form an insulator, thereby to form titanium oxide semiconductor on the surface of the metal titanium.

Where heating energy is given to the metal titanium from the metal side but not from the exterior for oxidization, a temperature gradient is formed in the oxide film being formed on the metal surface which includes a higher temperature on the metal side and a lower temperature on the surface of the oxide film in contact with the atmosphere. Because of this, oxygen atoms in the oxide film are readily diffusible toward the metal side where the temperature is higher. It is to be understood that, where the number of oxygen ions supplied through the surface of the oxide film is exceeded by that of oxygen ions diffused inwardly, the oxide film forms an n-type semiconductor having oxygen vacancies in its lattice. Accordingly, by utilizing the temperature gradient described above to adequate control the number of oxygen ions supplied through the film surface, it is possible to form a titanium oxide semiconductor having a rectifying action along the surface of contact with the opposite electrode.

This process of forming semiconductors, which utilizes diffusion of oxygen ions toward the interior of the oxide, can also be ascertained by the fact that an oxide film formed on the metal surface forms a semiconductor without involving any weight reduction when heated from the internally metal side in oxygen gas or a gaseous mixture of oxygen and an inert gas.

As apparent from the foregoing, according to the present invention, there is no need of treating the material in two separate steps of oxidization and reduction, and this simplifies the manufacturing procedure to a great extent. If any gas other than oxygen exists in the atmosphere during the heating procedure which may react with metal titanium to form an insulator, the characteristics of the semiconductor formed are impaired.

To give heat energy to metal titanium from the interior thereof, it is preferable for simplicity's sake to pass a D.C. current or an A.C. current having a low frequency, or to employ high frequency induction heating. The latter process requires more or less complicated apparatus, but is suitable in case the metal titanium has a special shape which cannot be heated uniformly by a D.C. current nor by a low frequency A.C. current.

Figure 8:
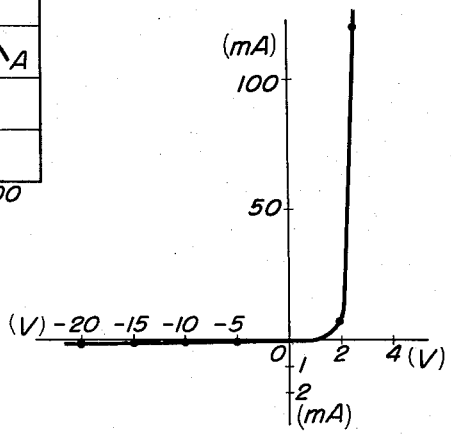
FIG. 8 represents a rectifying characteristic curve of a rectifier element including a titanium wire subjected to internal heating in pure oxygen.

To illustrate the present invention as applied to rectifier elements, a titanium wire of 0.5 mm. diameter was subjected to an etching treatment and then heated in pure oxygen gas at 760 mm. Hg pressure to a surface temperature of 1000° C. for five minutes by flowing a current of 5 A. therethrough. There was formed on the surface a black layer of titanium oxide semiconductor, the surface of which was coated with a silver electrode, which cooperated with another electrode in the form of the metal titanium to form a rectifier element as shown in FIG. 10. The rectifying characteristic of the rectifier is illustrated in FIG. 8. A forward current flows when the metal titanium forms a negative electrode while a reverse current flows when the metal titanium forms a positive electrode. The rectification ratio was 1700 at 2.5 v.

Figure 9:
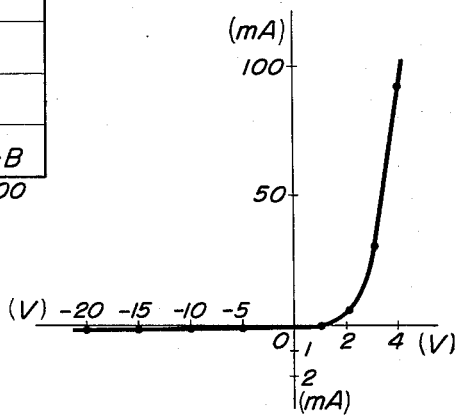
FIG. 9 represents a rectifying characteristic curve of a rectifier element having a titanium wire treated in a mixture of oxygen and argon gases.

To cite another example, a similar titanium wire was also subjected to an etching treatment and heated similarly but in this case in a gaseous mixture of oxygen having a partial pressure of 50 mm. Hg and argon having a partial pressure of 710 mm. Hg. Also, a black layer of titanium oxide semiconductor was formed on the metal surface. A rectifier element formed of this semiconductor exhibited a rectifying characteristic as shown in FIG. 9. The current flow directionality of this element is the same as in the preceding example. The rectification ratio was 4600.

Figure 11:
FIG. 11 is a diagrammatic showing of another form of the method of forming an oxide.

The procedure of forming oxide described above in detail in sections 1 and 2 is diagrammatically illustrated in FIG. 11.

3. Alternative Processes (A) To the surface of a base metal such as platinum is tightly bonded a metal such as Ti, Ta, Al, Hf, Cu, Si, Zr, Nb, Zn, Pb, Mg or Ba, which is oxidizable, by soldering, vacuum deposition, sputtering or other suitable technique, and then a current is passed through the base metal to effect internal heating in an atmosphere containing oxygen. As a consequence, an oxide is formed on the surface of the base metal, which oxide is utilizable as a dielectric or a semiconductor.

To cite a practical example, a Pt wire of 0.5 mm. diameter was coated with metal titanium by vacuum deposition and a current was passed through the Pt wire in air to internally heat the wire to 1300° C. thereby to form a $TiO_2$ film on the Pt surface. An electrode such as of silver was then bonded to the film to form a condenser, which had a capacity of 1000 pf per centimeter of the Pt wire. The condenser also exhibited a breakdown voltage as high as 40 v./$\mu$, characteristic of the internal heating process.

(B) In like manner, an oxide of such metal as Ti, Ta, Al, Hf, Cu, Si, Zr, Nb, Zn, Pb, Mg, Mn or Ba is placed in close contact with the surface of a base metal, for example of platinum, and then a current is passed through the base metal in an atmosphere containing oxygen to heat the metal internally, with the result that an oxide is formed on the surface of the base metal, which oxide is utilizable as a dielectric or a semiconductor.

To cite a practical example, a mixture of equal amounts of $TiO_2$ and BaO was bonded to the surface of a Pt ribbon of 5 mm. width and a current was passed therethrough in air to internally heat the ribbon to 1200° C. thereby to form $BaTiO_3$, which in turn was coated by a silver electrode to form a condenser, which had a capacity of 5000 pf/cm.$^2$ and a breakdown voltage of 30 kv./mm. These figures are higher than those of conventional condensers employing barium titanate, characteristic of the internal heating process used.

(C) A substance which produces an oxide when heated as in thermal decomposition, such as for example a metal nitrate ($Mn(NO_3)_2$, $Co(NO_3)_2$, $LiNO_3$, etc.), a metal carbonate ($BaCO_3$, $LiCO_3$, $MnCO_3$, etc.), an organic metal compound (alkoxy titanium, etc.), an aqueous solution of metallic oxide ($H_2CrO_7$, etc.), a mixture of these substances or a mixture of these substances and metal oxide, is placed in close contact with an electroconductive substance such as a metal or a mixture thereof with an organic substance, and then the electroconductive base substance is subjected to internal heating in an atmosphere containing oxygen as by flowing a current therethrough to form an oxide on the surface of the conductive base substance. This oxide is utilizable as a dielectric or a semiconductor.

To cite a practical example, a mixture of equal molar amounts of $TiO_2$ and $BaCO_3$ was bonded to a Pt ribbon of 0.5 mm. width and a current was passed therethrough in air to internally heat the ribbon to 1300° C. to form $BaTiO_3$. Further, a silver electrode was deposited to form a condenser, which had a capacity of 8000 pf/cm.$^2$ and a breakdown voltage of 30 kv./mm., these figures being characteristic of the internal heating.

As an application of this process, any of the above mentioned substances which produce an oxide upon thermal decomposition, for example, $Mn(NO_3)_2$ may be bonded to a film of metal oxide previously formed on its base metal as by anodic oxidation, followed by internal heating of the base metal as by flowing a current therethrough to form an oxide such as $MnO_2$ on the film.

For example, a Ta wire of 0.5 mm. width was subjected to anodic oxidation in a solution of phosphoric acid to form an anodized film, and to this film was applied an aqueous solution of $Mn(NO_3)_2$. A current was then passed through the Ta wire to internally heat the latter to 300° C. to form $MnO_2$ through thermal decomposition. To this film were applied colloidal carbon and then an electrode, for example, of silver to produce a condenser, which had a capacity of 0.1 $\mu$f./cm.$^2$. In the past, after application of $MnO_2$, re-formation has been repeated a number of times in an electrolytic solution to form a condenser. But, it has been found that the manufacture of condensers is feasible without employing re-formation where internal heating is performed as in this experimentation.

Figure 12:
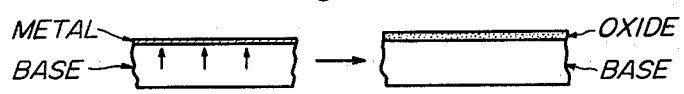

FIG. 12 diagrammatically illustrates the process of forming an oxide as described in detail in this section.

It will be appreciated from the foregoing that by employing the internal heating process according to the present invention a metal oxide is readily obtainable which is compact and has a satisfactory crystalline characteristic and that electric devices having substantially improved characteristics may be manufactured by utilizing the metal oxide, for example, as a dielectric, resistor or semiconductor. Additionally, the oxide formed by the method of the present invention is utilizable as an insulating material or a protecting material for electric conductors or the like.

What is claimed is:

1. A method for making electric elements such as capacitors and the like, comprising selecting a metal of 99.7% purity from the group consisting of titanium, tantalum, and zirconium, shaping said metal into a wire, cleaning the surface of said wire with a detergent, subsequently introducing said wire into a glycoborate solution at ordinary room temperature and forming an oxide film on the wire surface by subjecting said wire to anodic oxidation, introducing said wire with said oxide film into air and heating said wire to a maximum temperature of 1,3000° C. by passing electric current therethrough, whereby said oxide film grows in thickness and wherein a uniform oxide distribution results in said oxide film, and coating the oxide with a silver electrode to form a condenser.

2. A method for making electric elements such as condensers and the like, comprising selecting a metal from the group consisting of titanium, tantalum and zirconium, shaping said metal into a wire, cleaning the surface of said wire with a detergent solution, subsequently introducing said wire into a molten salt of sodium nitrate at 380° C., subjecting said wire while in said molten salt to anodic oxidization to form an oxidized film on the surface thereof, subsequently introducing said wire into air at atmospheric pressure and heating said wire to a maximum temperature of 1,300° C. by passing an electric current therethrough to cause a uniform oxide distribution in said oxide film, and coating said oxide film with a silver electrode to form a condenser.

(References on following page)

References Cited by the Examiner

UNITED STATES PATENTS

| | | | |
|---|---|---|---|
| 1,909,079 | 5/1933 | Steerup | 117—200 |
| 2,531,383 | 11/1960 | Arditi | 148—6.3 |
| 2,771,410 | 11/1956 | Russell et al. | 204—37 |
| 2,812,273 | 11/1957 | Shilliday et al. | 148—6.3 |
| 2,931,759 | 4/1960 | Hill | 204—37 |
| 2,934,670 | 4/1960 | Gingrande | 148—6.3 |
| 2,989,424 | 6/1961 | Angello | 117—200 |

FOREIGN PATENTS

| | | |
|---|---|---|
| 748,905 | 1/1945 | Germany. |
| 291,523 | 9/1953 | Switzerland. |

JOSEPH REBOLD, *Primary Examiner.*

MURRAY TILLMAN, RICHARD D. NEVIUS, G. KAPLAN, W. L. JARVIS, *Assistant Examiners.*